United States Patent [19]

Falkner, Jr.

[11] Patent Number: 4,540,314

[45] Date of Patent: Sep. 10, 1985

[54] TENSION LEG MEANS AND METHOD OF INSTALLING SAME FOR A MARINE PLATFORM

[75] Inventor: Chester B. Falkner, Jr., Huntington Beach, Calif.

[73] Assignee: Fluor Subsea Services, Inc., Irvine, Calif.

[21] Appl. No.: 684,166

[22] Filed: Dec. 21, 1984

Related U.S. Application Data

[63] Continuation of Ser. No. 361,786, Mar. 25, 1982, abandoned.

[51] Int. Cl.³ .................. B63B 35/44; E02B 17/00
[52] U.S. Cl. .................... 405/227; 114/265; 405/224
[58] Field of Search ........... 405/195, 224, 225, 227, 405/228; 114/264, 265; 175/5, 7

[56] References Cited

U.S. PATENT DOCUMENTS

| | | |
|---|---|---|
| 2,399,656 | 5/1946 | Armstrong . |
| 3,154,039 | 10/1964 | Knapp . |
| 3,559,410 | 2/1971 | Blenkarn et al. ............ 405/203 |
| 3,559,411 | 2/1971 | Blenkarn ................... 405/225 |
| 3,648,638 | 3/1972 | Blenkarn . |
| 3,780,685 | 12/1973 | Horton . |
| 3,905,319 | 9/1975 | Schuh . |
| 3,919,957 | 11/1975 | Ray et al. . |
| 3,978,804 | 9/1976 | Beynet et al. . |
| 3,982,492 | 9/1976 | Steddum . |
| 4,004,532 | 1/1977 | Reynolds ................... 114/256 |
| 4,169,424 | 10/1979 | Newby ...................... 114/265 |
| 4,226,555 | 10/1980 | Bourne et al. .............. 405/224 |
| 4,374,630 | 2/1983 | Fraser ...................... 405/224 |
| 4,391,554 | 6/1983 | Jones ....................... 405/224 |
| 4,405,261 | 9/1983 | Lawson ..................... 405/227 |

*Primary Examiner*—David H. Corbin
*Attorney, Agent, or Firm*—Poms, Smith, Lande & Rose

[57] ABSTRACT

A tension leg means for a marine platform having a hawse pipe positionable over an anchor template guide frame means which includes one or more anchor pile members set in a seabed, each tension leg means comprising one or more tension pipe strings each including a plurality of pipe string members interconnected by couplings. A connector means secures each pipe string to an anchor pile member in a manner to lock the pipe string against relative rotation with respect to the anchor pile member. The pipe string extends into said hawse pipe and a quick latch connector means supported by the platform is arranged to quickly latchably connect the upper end of the tension pipe string to the latch connector means and platform while permitting adjustment of tension in the tension pipe string. Tension pipe strings are adjusted to substantially uniform tension by the latch connector means. Flexible coupling means are provided in the pipe string above the connector means to the anchor pile member and just below the hawse pipe. An expandable stabilizer is carried on the pipe string at the bottom end of the hawse pipe to minimize transfer of lateral forces to the anchor pile member and platform. A method of installing a tension leg from a floatable marine platform including lowering an anchor template pile guide structure having pile conductors thereon to the sea floor, lowering an articulated guide structure including arm means to the template structure and indexing the position of the arm means with respect to each of anchor pile conductors and extending the arm means to position a pair of guide lines adjacent each conductor guide to facilitate drilling and guidance of anchor pile members into and through said anchor conductors, lowering a tension pipe string through a hawse pipe in the platform and attaching and locking a connector means to an anchor pile member against relative rotation, and connecting the upper end of the tension pipe string to a latch connector means carried by said platform and applying fluid pressure to the latch connector means to adjust tension in the associated pipe string.

40 Claims, 15 Drawing Figures

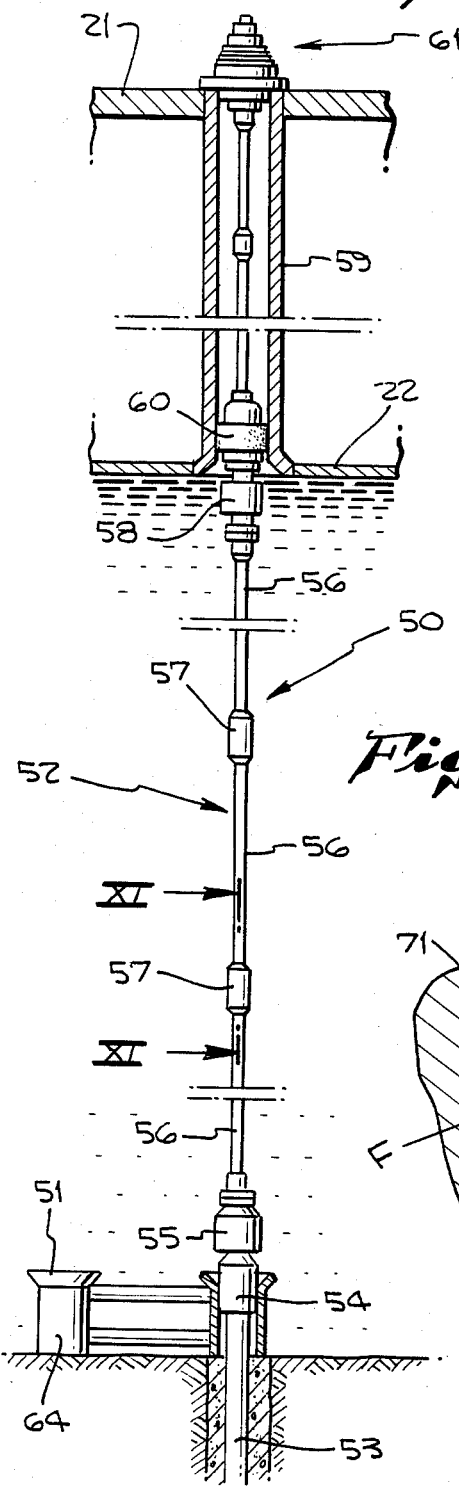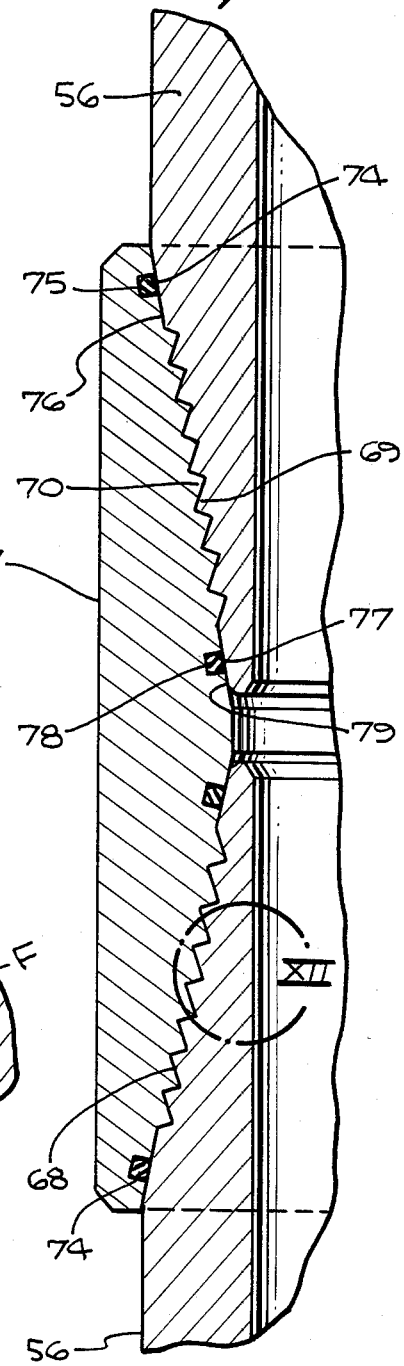

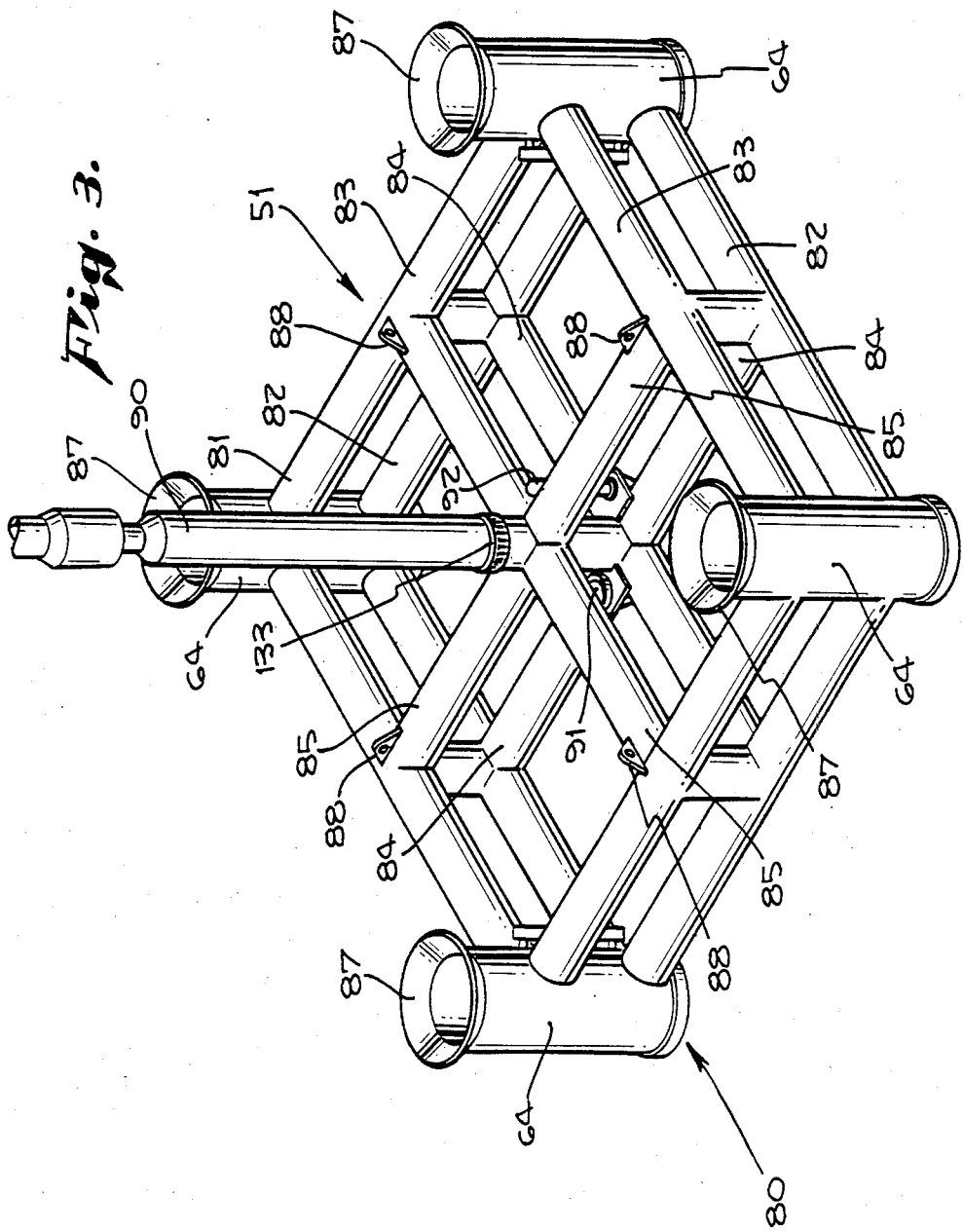

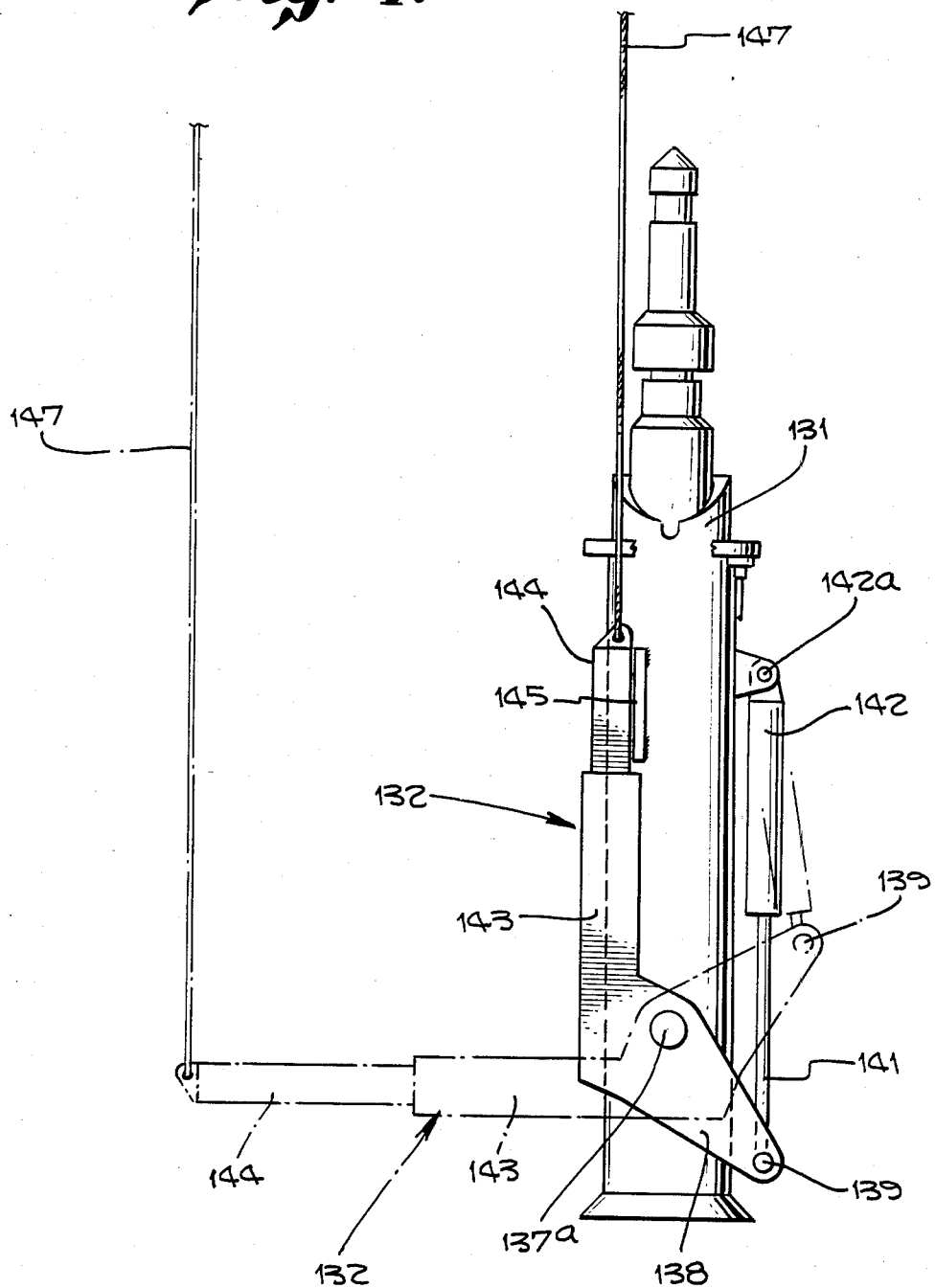

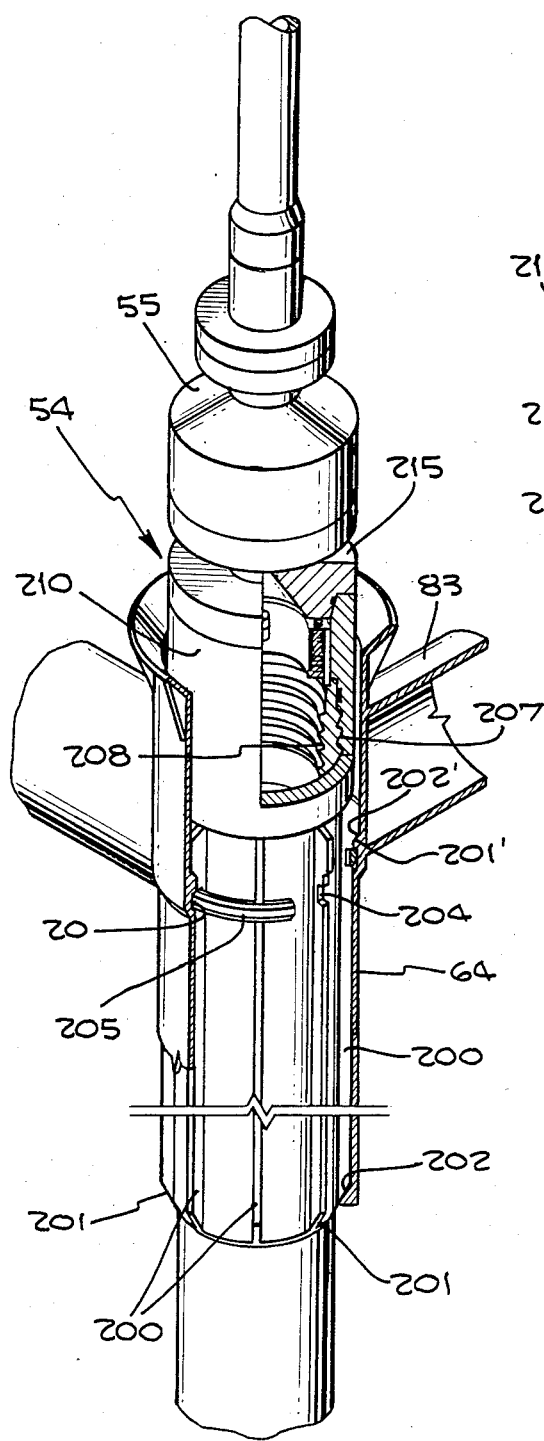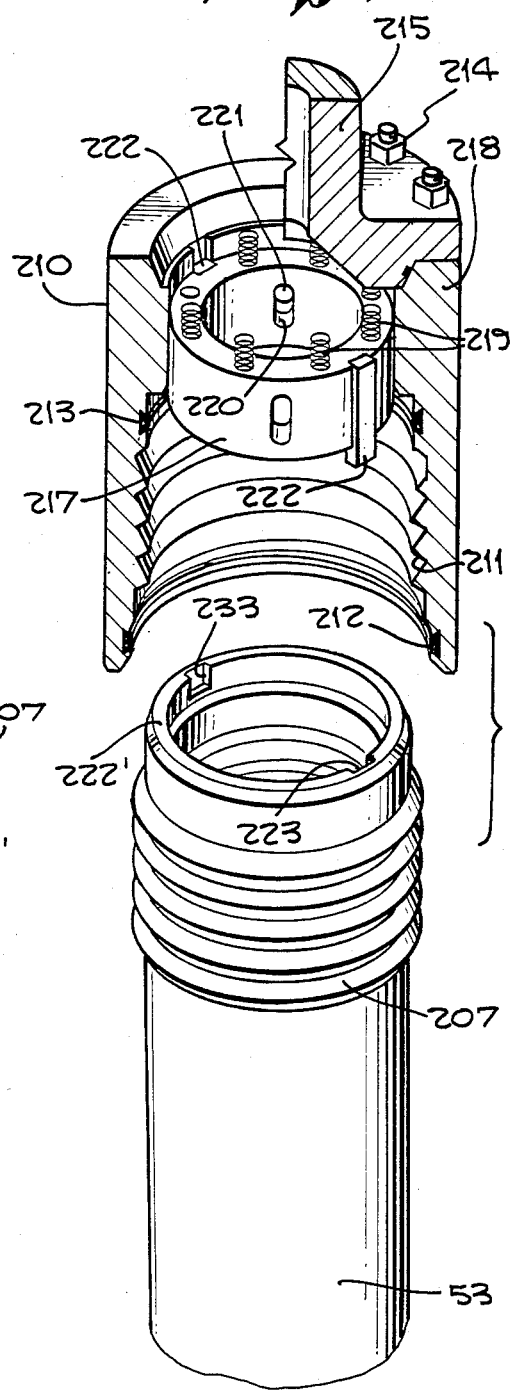

TENSION LEG MEANS AND METHOD OF INSTALLING SAME FOR A MARINE PLATFORM

This is a continuation of application Ser. No. 361,786, filed Mar. 25, 1982, now abandoned.

BACKGROUND OF INVENTION

Offshore well operations have included the use of floating marine platforms tethered above a subsea well site by various arrangements of mooring lines related to the hydrodynamic design of the platform. One of such platform designs is referred to as a tension leg platform in which the platform is secured by a plurality of vertical parallel tension legs which may extend from permanent or temporary anchor means at the sea floor to the platform, the legs being placed under sufficient tensional forces to accommodate changes in the platform loading and to minimize vertical motion components of the platform under wave and wind conditions. Prior proposed tension leg platforms of this general category are described in U.S. Pat. Nos. 2,399,656; 3,154,039; 3,648,638; 3,780,685; 3,978,804; 3,559,410; and 4,169,424. The tension legs comprised cable, wire, and/or pipe. Anchor means of such prior proposed tension leg platforms included temporary dead weight anchors and also anchors of permanent type in which the anchors were fixed and cemented in the seabed.

SUMMARY OF INVENTION

The present invention relates to a tension leg means and method of installing the same embodying novel features of construction and operation.

An object of the invention is to provide a tension leg means adapted to be readily installed with permanent anchor means.

Another object of the invention is to provide a tension leg means comprising one or more tension pipe strings and novel means for connecting the bottom end of each pipe string to an anchor means and the upper end of said string to the platform.

Another object of the invention is to provide a novel means for installing permanent anchor means for each of such pipe strings mentioned above, such anchor means including an anchor template guidance means adapted to be located below a vertical columnar member of the platform through which the upper part of the pipe strings extend for connection to the platform.

Another object of the present invention is to provide a quick latch connector means at the platform for securing the upper end of a tension pipe string and for imparting tension to said string for equalizing tension throughout a plurality of tension pipe strings forming a single tension leg means.

A further object of the invention is to provide a method for installing an anchor means and connecting a tension pipe string thereto.

A further object of the invention is to provide a tension leg means and a marine platform having a vertically extending hawse pipe through which the tension leg means extends, and providing a stabilizing means therefore cooperable with the hawse pipe.

A still further object of the invention is to provide a novel method for installing anchor means on the sea floor in which an anchor template guide means is utilized and an articulated guidance means cooperates therewith to facilitate location and installation of the lower end of a pipe string at a guide means.

A still further object of the invention is to provide a quick latch means at the platform for securing the upper end of a tension pipe string and for imparting selected tension to said pipe string.

The present invention contemplates a tension leg means for a marine platform in which a plurality of pipe string members and couplings interconnecting said members are provided, each pipe string being connected to a connector means on an anchor pile member embedded in the sea floor, a flexible joint means above the pile connector means, a hawse pipe in a vertical column in the platform for reception therethrough of the upper end of a tension pipe string, a flexible means on said pipe string below the bottom end of the hawse pipe, a stabilizing means at the lower end of the hawse pipe providing cushioning of lateral forces acting on the pipe string and transmittable to the platform, and a quick latch connector means secured to the platform and readily associated with a mandrel at the top of the pipe string for rapid engagement therewith for securing the upper end of the pipe string to the platform.

The invention also contemplates a method of installing a tension leg means from a platform having a hawse pipe in which a tension pipe string is lowered with a connector means at the bottom end thereof, a connector means attaches the bottom end of the tension pipe string to a fixed anchor pile member and locks the connector means against relative rotation with respect to the anchor pile member, the upper end of the tension pipe string is connected to a latch connector means carried by the platform, and fluid pressure is applied to the latch connector means to adjust or fine tune tension in the pipe string to equalize said tension with that of other pipe strings forming the tension leg means. The method of the invention also contemplates lowering an anchor template pile guide structure to the sea floor, the guide structure having a plurality of anchor pile conductors, lowering a guidance means over the guide post provided on the anchor pile structure, the guidance means including arm means which may be rotated about the guide post and indexed into a position with respect to an anchor pile guide conductor, the arm means being extendable to position a pair of guide lines adjacent the guide conductor to facilitate guidance of anchor pile members into and through the anchor pile guide conductors.

Various other objects and advantages of the present invention will be readily apparent from the following description of the drawings in which an exemplary embodiment of the invention is shown.

In the Drawings:

FIG. 2 is a schematic elevation view, partly in section, of a tension leg means platform hawse pipe, and anchor means.

FIG. 3 is a perspective view of an anchor pile guide means employed in the conversion of the platform to a tension leg platform.

FIG. 4a is an elevational view of the retractable guide means in folded relation for lowering and retrieval.

FIG. 6 is a perspective view, partly in section, of an anchor pile connector for the tension member.

FIG. 7 is an exploded perspective view, partly in section of the anchor pile connector shown in FIG. 6.

FIG. 8 is a perspective view, partly in section, of a tension member stabilizer means.

FIG. 9a is a fragmentary sectional view taken in a radial plane indicated by line IXa—IXa of FIG. 9.

FIG. 11 is an enlarged fragmentary sectional view of a coupling used in said tension leg means.

FIG. 12 is an enlarged fragmentary view of tension lock threads of the coupling of FIG. 11, the view being indicated by circular phantom line XII of FIG. 11.

The present application discloses a tension leg means and method of installing the same for a floating platform structure useful in offshore production of hydrocarbons from one or more wells for a sustained or permanent time period. The tension leg means described and claimed herein is also described but not specifically claimed in application Ser. No. 387,419 directed to the conversion of a semisubmersible floating platform to a tension leg platform.

Figure 1:
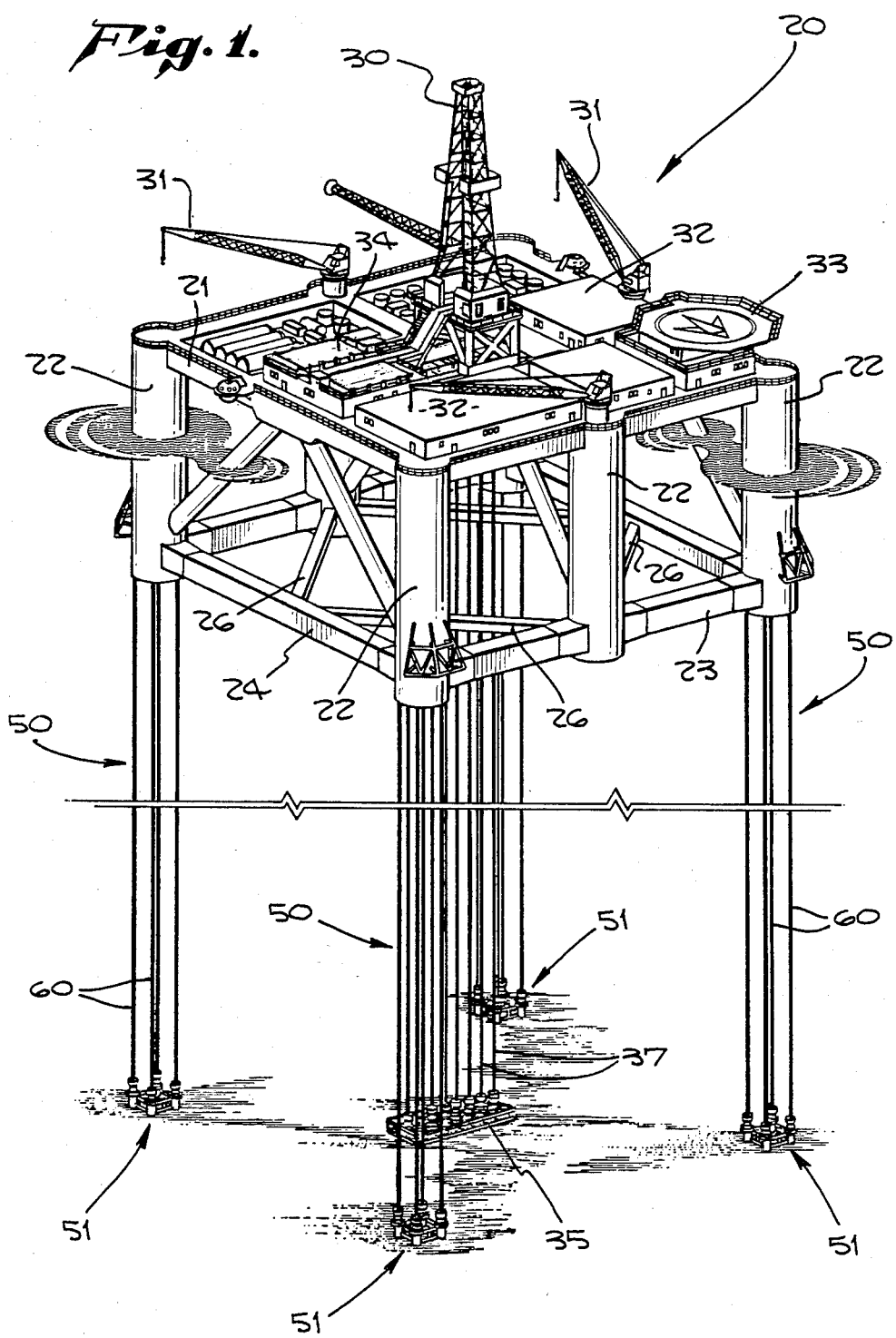
FIG. 1 is a perspective view of a mobile offshore platform having tension leg means embodying this invention.

In the example of the invention disclosed herein, an offshore, mobile, marine platform generally indicated at 20 is of rectangular form. It will be understood that the platform may be of other polygonal shapes, such as triangular, hexagonal, octagonal and the like. In FIG. 1, platform 20 generally comprises a platform deck 21, a plurality of buoyant vertical columnar members 22 arranged with three columnar members on each side of deck 21 and of selected diameter and height, and a plurality of horizontal buoyant members 23 interconnecting the columnar members along each side and horizontal end buoyant members 24 interconnecting corner columnar members 22 at ends of the rectangular platform. Suitable structural diagonal members 25 interconnect lower portions of corner vertical columnar members and the platform deck. In the planar zone of the horizontal buoyant members 23 and 24, internal diagonal structural horizontal members 26 brace the lower portion of the platform. In this example, horizontal buoyant members 23 and 24 are shown of rectangular cross sectional configuration, although it will be understood that oval or cylindrical configurations may be employed in certain platform designs.

The displacement ratio of the horizontal members 23, 24 with respect to the total displacement of the platform including horizontal and vertical buoyant members may be in the order of 0.30 to 0.60 percent as described in U.S. Patent 3,780,685. It will be understood that other tension leg designs may be used such as disclosed in U.S. Reissue Pat. Nos. (30590), and (3,154,039).

In this example, platform deck 21, FIG. 1, carries various well drilling equipment including a suitable derrick 30 on the deck 21, a plurality of rotatably mounted cranes 31 located adjacent edges of the deck to facilitate handling of well equipment, suitable buildings 32 for housing certain supplies and personnel, a heliport 33 at one corner of the platform to accommodate landing and takeoff of helicopters, and supply and storage areas 34 for various equipment required in drilling and in production operations. This equipment is indicated in general only, it being understood that the type and amount of such equipment depends upon the operation for which the platform 20 is to be outfitted.

Platform 20 is adapted to be anchored above a well site in tension leg mode. Generally, each of the corner vertical buoyant columnar members 22 are connected with tension leg means 50 provided with permanent anchor means 51 at the sea floor. The platform is shown as being located over a plurality of wells defined by a multiple well template 35 located on the sea floor and provided with wellhead means 36 and production lines or risers 37 extending to the platform deck and connected with the production equipment at the deck as schematically illustrated thereon, such production equipment being well-known. In tension leg mode with permanent anchors 51, the tension leg means 50 are arranged substantially parallel and are connected to the platform through the corner vertical columnar members 22 in a manner hereafter described. In tension leg mode, platform 20 is positioned at a selected draft in the water in which the vertical columnar buoyant members 22 and horizontal buoyant members 23 and 24 are in the sphere of expected wave action so that vertical forces acting on the platform are substantially neutralized or offset and the platform is not subject to heave, pitch or roll as described in U.S. Pat. No. 3,780,685.

Tension Leg Means

Generally, each tension leg means 50 may comprise one or more tension members, such as interconnected sections of pipe, or elongate members adapted to be placed under tensional stress. For purposes of brevity in the description and clarity in the drawings only one tension string 52 is shown in FIG. 2. Each tension leg means 50 may include a plurality of tension pipe strings 52, in this example, for strings. Each string 52 may generally comprise a pile member 53, a pile connector means 54, a bottom flexible joint 55, a plurality of pipe string members 56 interconnected by coupling members 57, an upper flexible joint 58 just beneath the lower end of hawse pipe 59 carried in columnar member 22, a tension member stabilizer 60 engageable with the lower interior end of the hawse pipe 59, and quick latch means 61 at the platform deck 21 for securement of the top end of the tension string 52 to the platform. Each tension string 52 (FIG. 2) is adapted at its lower end to be connected to a pile member 53 permanently secured as by cementing in the seabed. At its upper end, each tension string 52 passes through a hawse pipe 59 provided in columnar vertical member 22. The upper end of tension string 52 is connected to latch means 61 which is landed on and secured to the top deck portion 21 at the top of vertical columnar member 22. Vertical columnar member 22 is of sufficient diameter to include four equally radially spaced hawse pipes 59 for accommodating the three other tension strings 52. The number of and spacing of the hawse pipes 59 in the columnar member 22 corresponds to the spacing of anchor pile guide conductor members 64.

Each tubular pipe member or section 56 is of suitable length, diameter and metal wall section. Adjacent ends of pipe section 56 are preferably coupled together by a coupling member 57, FIG. 11, the coupling member and the ends of pipe section 56 received therein being provided with coarse buttress tension lock thread means indicated at 68. Tension lock thread means 68 comprises cooperable pin threads 69 and box section threads 70 which have a relatively flat seizing taper of about 30° or less to permit coupling with low or minimum torque makeup and breakout, but having high resistance to backoff or unthreading under tension loads. It will be apparent from FIG. 12 that under a tension load applied in the direction of arrow L and transmitted between box threads 70 and pin threads 69 that thread surface 71 and mating thread surface 72 are at an angle to the direction of the load force sufficient that forces F result in large normal friction forces which will resist such backing off under load.

Coupling member 57 is provided with an annular interior groove 74 adjacent each end to accommodate a seal member 75 which bears against a tapered flat surface 76 at the end of the threaded section remote from the end of the pipe section. Coupling member 57 is also provided with annular interior grooves 77 for receiving a seal member 78 at the central section of the coupling member 57 for engagement of the seal members 78 with the conical surface 79 at the end of the threaded section. The seal members 75 and 78 resist introduction of sea water between the threads and assists in maintaining the threads in condition for disassembly and maintenance of the tension string when required.

Anchor Pile Guide Means

In this example, anchor means 51 for tension leg means 50 may comprise an anchor pile guide means generally indicated at 80 in FIG. 3. Guide means 80 may comprise a polygonal or square frame means 81 comprising parallel vertically spaced peripheral members 82 and 83 interconnected by internal top and bottom parallel members 84 and 85 arranged at 90° and forming a cross interconnecting mid points of peripheral members 82, 83, respectively. At corners of square frame means 81 may be provided cylindrical guide conductors 64 provided with upwardly, outwardly flaring top portions 87 to facilitate guiding of an anchor pile member 53 through conductor 64. Frame means 81 may be provided with cleats 88 at mid points of top side members 83 to facilitate handling of the guide means 80. Secured at the intersection of crossing internal members 84, 85 is provided a central guide post 90 having means to connect a single guide line thereto.

Adjacent the bottom portion of guide post 90 may be provided a level indicator 91 of suitable make, as for example, a "bulls eye" type, and adapted to be monitored by underwater television means, so that anchor pile guide means 51 may be installed on the sea floor in a level or horizontal position. Installation of the anchor guide means 51 in level position assures that the axes of the conductors are vertical and in desired position for the anchor pile drilling operation.

Also, adjacent the bottom portion of guide post 90 is a signal sending device 92 or pinger which facilitates locating anchor means 51 at great depths in water by use of well-known sonar systems.

As illustrated in FIG. 1, each of the anchor pile guide means 51 are adapted to be located vertically beneath corner columnar members 22 of the platform. In one example each anchor guide means 80 may be suitably releasably secured to the bottom end of a platform vertical column 22 for transporting and carrying of the anchor guide means 80 during movement of the platform to a well site and during exploratory drilling while the platform may be operated in semisubmersible catenary moored mode as described in application Ser. No. 387,419. When it is determined that the well site is to be produced and with the platform in selected position over the well site, each of the anchor means 80 may be released from the bottom of its associated column member 22 and lowered to the sea floor by means of drill pipe. Thus, when the anchor guide means 80 is positioned on the sea floor and is ready for installation of the anchor piles 53 through the guide conductors 64, the center post 90 provides a means for connection of a single guide line to anchor means 51 for guiding tools for drilling of holes in the sea floor for the anchor pile members 53.

Tension Leg Means Installation Unit

Figure 10:
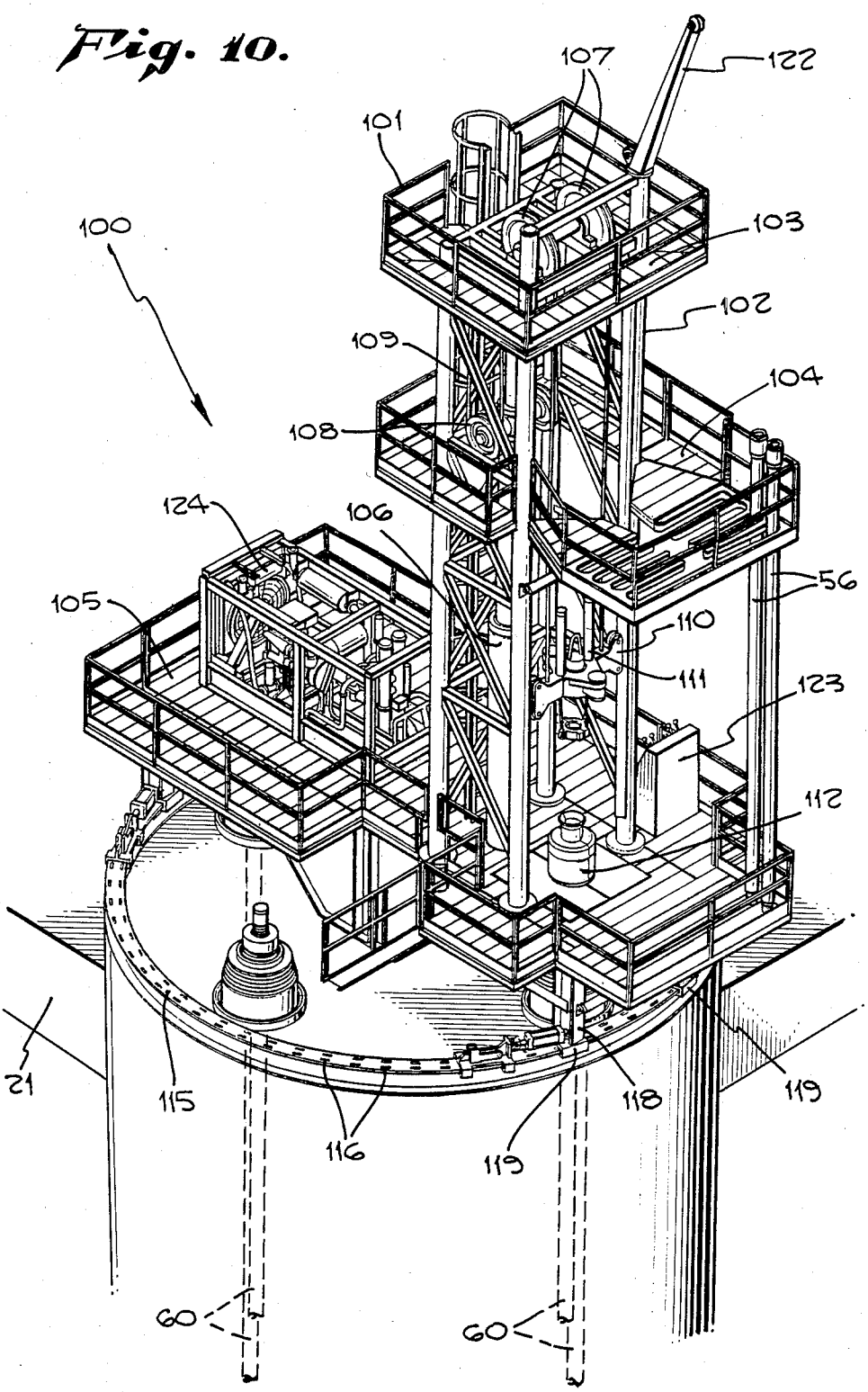
FIG. 10 is a perspective view of a tension member installation rig adapted to be mounted over each vertical column.

While the anchor pile guide means 51 are being lowered and set on the sea floor, a tension member installation unit generally indicated at 100, FIG. 10, may be suitably mounted on the deck over the top portion of a vertical columnar member 22. In FIG. 10, unit 100 comprises a derrick generally indicated at 101 including vertical columns 102 suitably braced and supporting a top deck 103, an intermediate deck 104 and a lower working deck 105. Within the arrangement of four columns 102 may be supported a hydraulic hoist means 106 extending upwardly from the lower deck 105. The hydraulic hoist means is connected with a pair of top pulleys 107 reaved with pulleys 108 on the hydraulic hoist 106 by lines 109. Lines 109 are connected to a travelling yoke 110 provided with a stroking elevator 111 and a rotatable pipe spinner. A hydraulic operated bushing 112 serves to support the pipe string when threading of a next pipe joint during running in of the pipe string. The travelling yoke and pipe spinner are vertically guided along two of columns 102 and are adapted to pick up and hold pipe sections 56 for introduction of the lower end of the pipe section into one of the four hawse pipes 59 provided in columnar member 22.

Unit 100 may be mounted on the platform deck at the columnar member for rotation about the axis of the columnar member 22 so that and travelling yoke 110 may be readily selectively positioned over each of the four hawse pipes provided in a columnar member 22 and each hawse pipe oriented with an anchor pile guide conductors 64 at the sea floor by positioning of the platform. The rotation of unit 100 may be provided by a circular track 115 having a plurality of circumferentially spaced ratchet holes 116. The lower deck 105 may be provided with downwardly extending support members 118 which carry shoes 119 slidable on circular track 115. A hydraulic jack means 120 at each of the support members 118 is engageable with holes 116 so that unit 100 may be rotated through 90 degrees to the next hawse pipe in columnar member 22 and precisely incrementally indexed with respect thereto by jack means 120.

A pivoted derrick arm 122 is carried by one of the columns 102 at the top deck 103 for facilitating handling of the tension pipe sections 56 stored in the rack therefor at intermediate deck 104. A console 123 is provided for controlling the several operations required in installing and connecting the tension pipe sections 56. Suitable power equipment 124 is also provided on the lower deck to provide the necessary electrical, hydraulic, and pneumatic systems required for operating the unit 100.

Main hoisting cylinder 106 may be operated as a heave compensator and, for example, during the transition from catenary moored mode to tension moored mode.

Articulated Guidance Means

Figure 4:
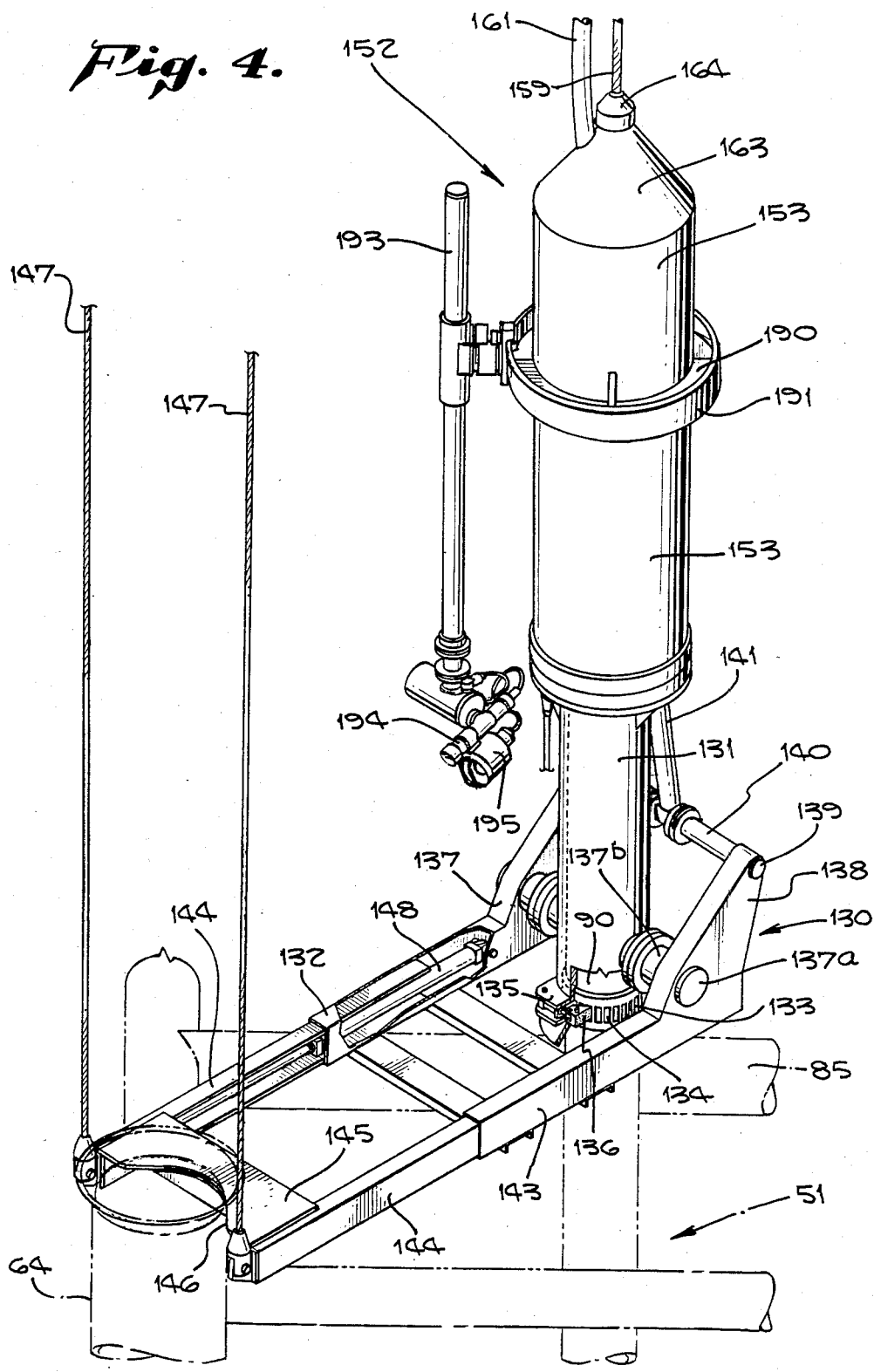
FIG. 4 is a perspective view of a retractable guide means for installation of the anchor pile and the tension member.

An articulated rotatable and retractable guide structure generally indicated at 130, FIG. 4, is associated with center guide post 90 of the pile member guide means 51 and provides guidance means for installing anchor pile members 53 at each of guide conductors 64. Guide structure 130 includes a cylindrical member 131 adapted to be received over guide post 90 in concentric relation and rotatable about the axis of post 90 for positioning adjustable retractable laterally extending guide arms 132 in registration with an anchor pile guide conductor 64. Means for controlling such indexing and registration is provided by an annular rack member 133 provided on center guide post 90 adjacent the intersection of cross members 85 of the guide means 51. The annular rack member 133 may be provided with a plurality of circumferentially spaced recesses 134 engaged by a hydraulically actuated positioning jack 135 having a pawl 136 engageable with recesses 134 for incrementally rotating the guide structure. The cylindrical member 131 may have a bottom landing surface cooperable with a landing surface on the center column of the guide means 51 to vertically position jack 135 for registration with the rack 133. Means for controlling jack 135 will be described hereafter.

Retractable arms 132 of guide structure 130 include a base arm portion 137 having a pivotal mounting at 137a on trunnions 137b carried by cylindrical member 131. Base arm portion 137 at the pivotal mounting 137a may be of generally triangular shape, the upper portion 138 providing a pivotal connection at 139 with a transverse shaft 140 pivotally connected to a piston rod 141 of a cylinder means 142 pivotally connected at 142a to member 131 for rotation of the arm means 132 about axis 137a into an upwardly folded position generally parallel to cylindrical member 131 as shown in FIG. 4a.

Arm means 132 includes square cross section hollow portion 143 integral with base portions 137 and adapted to slidably telescopically receive therewithin outer square section arm portions 144. At their outer ends, arm portions 144 carry a transverse registration plate 145 having a convex outer edge 146 of generally the same curvature as the outer circumference of the conductor 64. Outer arm portions 144 may be moved into the square section portions 143 by piston and cylinder means 148 carried therewithin so as to retract the outer arm portions 144 therewithin and plate 145 to allow turning of the guide structure to an adjacent guide conductor 64 or for pivotally lifting by cylinder means 142 the collapsed arms 144, 143 when it is desired to rotate the structure about axis 137a to position the arms adjacent to and approximately parallel with the cylindrical member 131 for lowering or retrieving the articulated guide structure 130.

It will be noted that registration plate 145, together with the outer ends of arm portions 144 provide means for positioning the pair of guide lines 147 in approximately diametrically opposite relation to the axis of the guide conductor 64. Guide lines 147 may serve to facilitate guiding of drill pipe and suitable tools in coaxial relation with conductor 64 for the preparation of holes in the sea floor for pile members 53, and for guiding pile members into conductor 64.

It will thus be readily apparent that after the anchor pile guide means 51 has been located on the sea floor vertically directly beneath a column 22 and conductors 64 oriented with respect to corresponding hawse pipes in column 22, the articulate guide structure 130 may be readily lowered and indexed onto the anchor guide means 51 with arm means 132 and guide lines 147 in registration with a guide conductor 64 for drilling of the holes in the sea floor for the anchor pile members.

Articulated Guide Structure Control Pod

Figure 5:
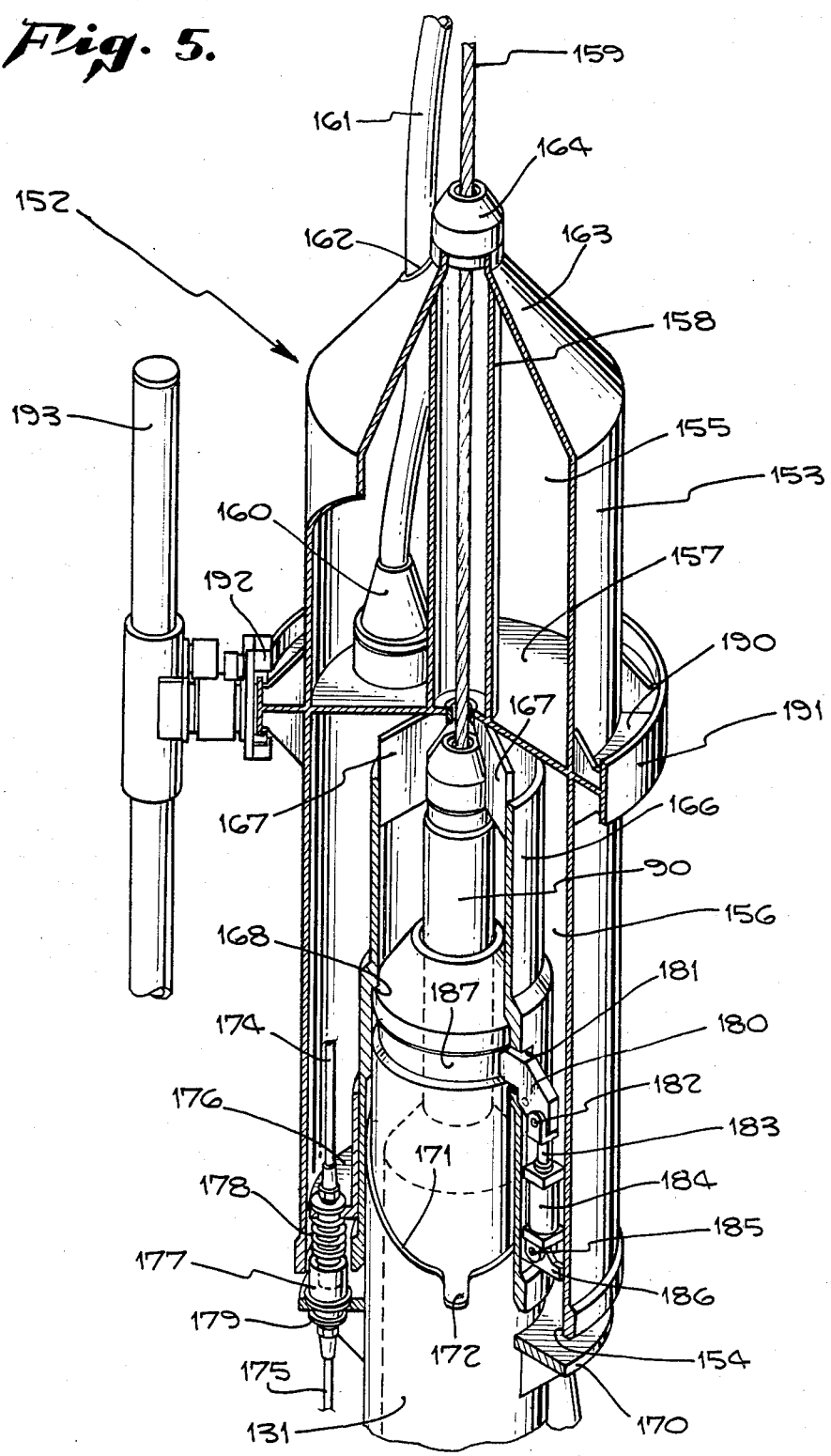
FIG. 5 is a perspective view, partly in section, of a retrievable control pod for use with the retractable guide means shown in FIG. 5.

Means for controlling indexing and positioning of the articulate guide structure 130, during the drilling of the pile member holes, installation of the pile members therein at each conductor lowered and indexed, and for lowering and retrieving guide structure 130 may comprise a control pod 152 (FIG. 4 and 5). Pod 152 includes an outer cylindrical body member 153 having a bottom open end 154. Body member 153 may be divided into an upper compartment 155 and a lower compartment 156 separated by a transverse bulkhead or wall 157. Upper chamber 155 includes a coaxial cylindrical tube 158 for guidance on a single guide line 159 connected with guide post 90 of the pile guide means 51. Upper chamber 155 also houses a lower coupling 160 of an electrical and hydraulic control line bundle 161 which extends through a sealed port 162 in the conical end wall 163 of body member 153. A guide collar 164 permits free passage of guide line 159 into tube 158 during lowering or raising of the control pod assembly.

Lower chamber 156 is provided with an internal cylindrical body element 166 secured to wall 157 by support plates 167 as by welding to internal body element 166 and wall 157. Body element 166 has an internal landing surface 168 corresponding with the top conical configuration of member 131 and to be landed thereon in assembly of the pod 152 with the articulated guide structure 130. The bottom edge portions of body member 153 and body element 166 in landed position are in vertical spaced relation to annular flange 170 carried by cylindrical member 131.

Means for angular orientation of the pod 152 with cylindrical member 131 may comprise a helical cam surface 171 on member 131 lying in a plane at an angle to the axis of member 131, the lower end of cam surface 171 being provided with a downward extending recess 172 for reception of an internal cam lug (not shown) on cylindrical body element 166 adjacent the bottom end of element 166. When pod 152 is lowered, the cam lug engages the cam surfaces 171 and during lowering rotates pod 152 until the lug engages recess 172 to precisely orient pod 152 in landed position with respect to the cylindrical member 131.

Such angular orientation of pod 152 facilitates coupling of interior hydraulic fluid pressure lines such as 174 (exemplary) which is connected to umbilical coupling 160 and provides a hydraulic coupling to line 175 which may lead to and operate indexing jack means 135, or the cylinder means 141, or the cylinder means 148 for operation of the articulated guide structure. Line 174 extends through a segmental flange 176 provided on cylindrical element 166 just above the bottom end thereof. Coupling 177 connected to line 174 is biased downwardly by a spring 178 so that when the pod 152 drops into its final location as indicated by recess 172, the spring 178 is compressed and coupling 177 is urged into tight fluid sealed relation with its mating coupling element 179 of line 175 which extends through flange 170 on member 131. Only one such coupling arrangement is illustrated for purposes of brevity, it being understood that lines for other fluid operable systems may be similarly automatically coupled for fluid or electrical communication upon such lowering of pod 152.

Means for locking pod 152 to articulated guide structure 130 may include one or more latch dogs 180 in circumferential spaced relation about the internal cylindrical element 166 and extending through aligned ports 181 therein. Latch dogs 180 may be pivoted at 182 to a yoke carried by the upper end of a piston rod 183 of a fluid cylinder means 184 pivotally connected at 185 to a bracket 186 carried by the bottom portion of cylindrical element 166. The location of latch dogs 180 is predetermined so that when the pod 152 is landed in angular orientation with member 131, actuation of latch dogs 180 will cause their engagement with an annular latch groove 187 provided at the top end of cylindrical member 131.

Although not shown in the drawings the outer body member 153, tube 158, and cylindrical element 166 of control pod 152 are provided with a longitudinally extending through slot in a vertical axial plane for permitting the pod 152 to be assembled in concentric relation with the single guide line 159 and to slidably move therealong during lowering and raising. The collar 164 may be a split collar readily attached to the top of the pod 152 during assembly of the pod with line 159. It will be noted that by this arrangement of pod 152 with the single guide line 159, the umbilical line 161 may be loosely associated with guide line 159 for restraining umbilical line 161 from trailing or separation from the line 159 because of the ocean currents.

The transverse wall 157 may be provided with external flange extensions 190 which may carry a peripheral ring track 191 for mounting thereon of a slidable carrier 192 for supporting a vertically adjustable rod 193 carrying at its lower end a TV camera 194 and light means 195. Carrier 192 is adapted to be moved around the ring track 191 by suitable power means (not shown) for changing the location of TV camera 194 and and light means 195 so that the installation of pile members in each of the four corner conductors 64 may be readily observed at the platform. Means for controlling the position of the camera, light means, and rotational position of the carrier 192 are not shown since such are well known in the art.

It will be readily apparent that control pod 152 provides control means for operation of articulated guide means 130 and that the control pod may be readily retrieved by unlatching latch dogs 180 and raising the control pod 152 and causing separation of the coupling numbers 177 and 179. Retrieval of the control pod frees the guide line 159 for lowering a suitable running tool for raising articulated guide structure 130 to permit its operation at another anchor pile guide means 51 beneath another column 22 of the platform.

Anchor Pile Connector

In FIGS. 6 and 7, is shown one example of an anchor pile connector means 54. Anchor pile member 53 is provided at its top end with longitudinally extending parallel angularly spaced ribs 200 for guiding reception within conductor 64. The lower end of each rib 200 may be provided with a tapered face 201 landed on an internal annular tapered landing surface 202 provided on conductor 64. FIG. 6 also illustrates another system for landing anchor pile member 53 on conductor 64 as shown by a landing surface 202' engageable with a landing edge 201' adjacent frame member 83. The upper portion of each rib 200 may be provided with a stepped cutout 204 adapted to receive a split ring 205 for reception in cutouts 204 and an annular groove 206 in conductor 64 to further interlock the upper end of pile member 53 with the conductor 64.

The upper end of pile member 53 is provided with external tension lock threads 207 and also with auxillary back up or stand-by internal threads 208 for use in landing the pile member in the conductor 64. A pile connector coupling 210 is provided with internal tension lock threads 211 for engagement with external threads 207 when the lower end of the tension member is connected to the pile member 53. Tension lock threads 211, 207 provide a mechanial coupling connection adapted for remote engagement and breakout with low torque and are resistent to cross threading. Coupling member 210 also includes internal annular seal means 212 and 213 for engagement with the upper end of pile member 53. The upper end of coupling member 210 is provided with a flange connection with suitable securing bolts 214 to a connector member 215 of a flexible joint 55.

In this example, means for locking coupling member 210 against rotation on the threads 207 of pile member 53 is provided by a lock ring 217 carried within the upper internally thickened portion 218 of coupling member 210 and normally biased downwardly by a plurality of springs 219 circumferentially spaced about the top edge face of ring 217. Ring 217 is provided limited vertical movement by vertically elongated diametrical slots 220 in which are received for sliding engagement pins 221 carried by upper portion 218. The pin and slot arrangement 220 and 221 prevents relative rotation of ring 217 with respect to coupling member 210. Lock ring 217 carries at its outer circumference a pair of diametrically opposite lock keys 222 each of which extends below the bottom edge of ring 217 and are adapted to engage lock key recesses 223 provided in the internal surface of the upper end of pile member 53. It will thus be apparent that when the coupling member 210 is threadedly engaged with the threads 207 and rotated about the pile member 53 that the bottom edge faces of lock keys 222 will engage the top edge face 222' of pile member 53 until the springs 219 are compressed providing full threaded engagement of threads 207, 211 at which time the lock keys will be spring biased into the key recesses 223 during the last turn of rotation of coupling member 210. In such a locked condition, relative movement between the coupling member 210 and the top portion of pile member 53 is prevented. Further, the threads 211 and 207 are of a type to resist unthreading under tension loads.

When it is desired to release the lower end of the tension member from the pile member 53, a release tool may be lowered through the tension member string and through the lock ring 217, and then expanded so as to permit the lock ring to be raised against the pressure of springs 219 to disengage the lower ends of lock keys 222 from the key recesses 223. In such raised position of the lock ring 217 and upon a relaxation of the tension load, the coupling member 210 may be unthreaded and the tension leg disconnected from the anchor means.

Figure 13:
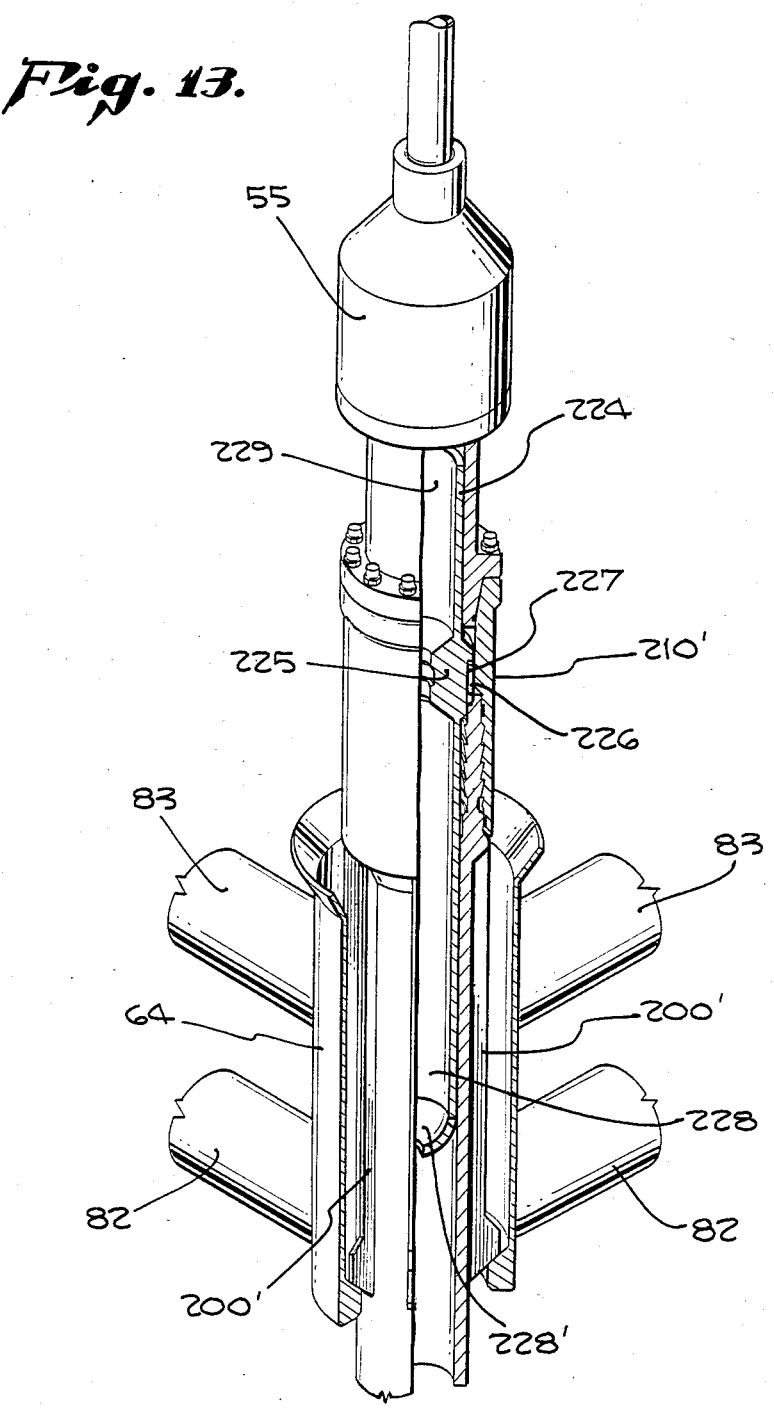
FIG. 13 is a perspective view of a modification of the anchor pile connector.

It will be understood that other examples of a lock system for a coupling member 210 for a pile connector may be provided. In place of a biased lock ring 217, an internal elongated tubular lock member 224, FIG. 13 may be inserted through coupling member 210' and into the upper portion of pile member 53. Tubular lock member 224 has an enlarged thickened section 225 in spaced relation to its top end, the metal section 225 being provided with a longitudinally extending external key rib 226 adapted to be lowered into engagement with an internal longitudinally extending recess 227 provided on internal surfaces of coupling member 210' and pile member 53 to provide a key lock arrangement between the members 210', 224 and 53.

Lock member 224 includes a relatively long lower tubular portion 228 below section 225 and a relatively short upper tubular portion 229 above section 225. Portions 228 and 229 facilitate axial alignment of the bottom of the tension leg string during installation. When coupling member 210', lock member 224, and flex joint 55 are lowered to threadedly engage the pile member 53, the flex joint 55 may allow some axial misalignment of coupling member 210' with the pile member. Lower portion 228 of lock member 224 has a rounded bottom end 228' which facilitates leading portion 228 into the pile member. As downward movement continues, portion 228 brings coupling member 210' into axial alignment to permit threaded engagement to begin and to continue upon rotation of the tension string. Upon reaching full threaded engagement, the lock member key rib 226 drops into recess 227 to lock the members 210', 224, and 53 against relative rotation.

Disconnection of the tension string from the pile member may be accomplished as in the prior example; that is, by raising member 224 to withdraw key rib 226 from recess 227 and then unthreading coupling member 210'.

Flexible Joints

Each tension string is provided with a flex joint 55 at its lower end and a flexible joint 58 at its upper end as previously generally described. These flexible joints permit angular movement of the axis of the tension member with respect to the fixed axis of the anchor pile connector 54 and with respect to the hawse pipe 59 without imparting substantial bending stress to the tension member as the platform undergoes offset and oscillatory motion in response to wind, wave and current in the ocean environment. Such flexible joints are or well-known make and manufacture, such as the Lockseal coupling manufactured by Murdock Machine and Engineering Company of Texas.

Tension Member Stabilizer Means

In FIG. 8, stabilizer means 60 for each tension string 52 is shown at the lower open end of hawse pipe 59 carried in a column 22 of the platform. Stabilizer means 60 is located at or adjacent to the upper flexible joint means 58 and generally serves to transmit any lateral or horizontal components of the mooring forces to the tension leg platform in a nondestructive manner. Stabilizer means 60 is connected in suitable manner to the upper end of flexible joint means 58 and also the lower end of a pipe section 56 extending above the stabilizer means.

Stabilizer means 60 includes a circular base member 230 positioned just within the bottom opening 231 of hawse pipe 59. Seated on base member 230 is an annular radially expandable rubber or neoprene member 232 of selected height and diameter and when subjected to compressive forces is arranged to flow radially outwardly for engagement as at 233 with the interior cylindrical surfaces of the lower end of hawse pipe 59. The lower end of hawse pipe 59 may be provided with a thickened section of metal as at 234.

Means for applying vertical compressive forces to the expandable rubber member 232 may include a plurality of circumferentially spaced piston and cylinder means 235. The lower end of cylinder means 235 may be pivotally connected at 236 to a bracket 237 carried on a pressure ring 238 adapted to seat on the top surface of expandable rubber means 232. Each piston and cylinder means 235 includes a piston 239 and cylinder means 240 thereof may be pivotally connected at 241 to a bracket 242 on a cylindrical collar 243. Collar 243 may be spaced from pressure ring 238 by spacer member 244 and a slightly diametrically enlarged lower cylindrical spacer member 245 which provides a cylindrical guide member for pressure ring 238. Above collar 243 is provided a suitable cylindrical fitting 247 providing with a plurality of passageways (not shown) for fluid connection and communication with fluid pressure lines 248 connected at their upper ends on the platform deck with a source of pressure fluid. The piston and cylinder means 235, pressure ring 238, and collar 243 may be enclosed within a canopy 249 of less diameter than the interior diameter of hawse pipe 59.

When fluid pressure is introduced through lines 248 to the piston and cylinder means 235, the pressure ring 238 is moved downwardly under substantially uniform annular pressure and will serve to circumferentially evenly compress the expandable rubber member 232 against base member 230 to cause the outer circumferential surface 232a thereof to resiliently frictionally engage the interior surface of the hawse pipe. Expansion of member 232 radially outwardly into frictional engagement with the internal surfaces of the hawse pipe yieldably resists and cushion the lateral component of any tension forces transmitted through the tension leg string when platform 22 is laterally displaced from its vertical positon over its anchor means 51. The resilient frictional engagement of member 232 with the interior surface of the hawse pipe also accommodates slight vertical oscillatory motion resulting from cyclical tension member loads by flexure of member 232, rather than sliding contact which would cause wear. Thus, virtually only vertical tension forces will be transmitted from the tension string through the tension string portion in the hawse pipe to the tension string quick latch means 61 shown in FIG. 9.

Tension String Quick Latch Means

Figure 9:
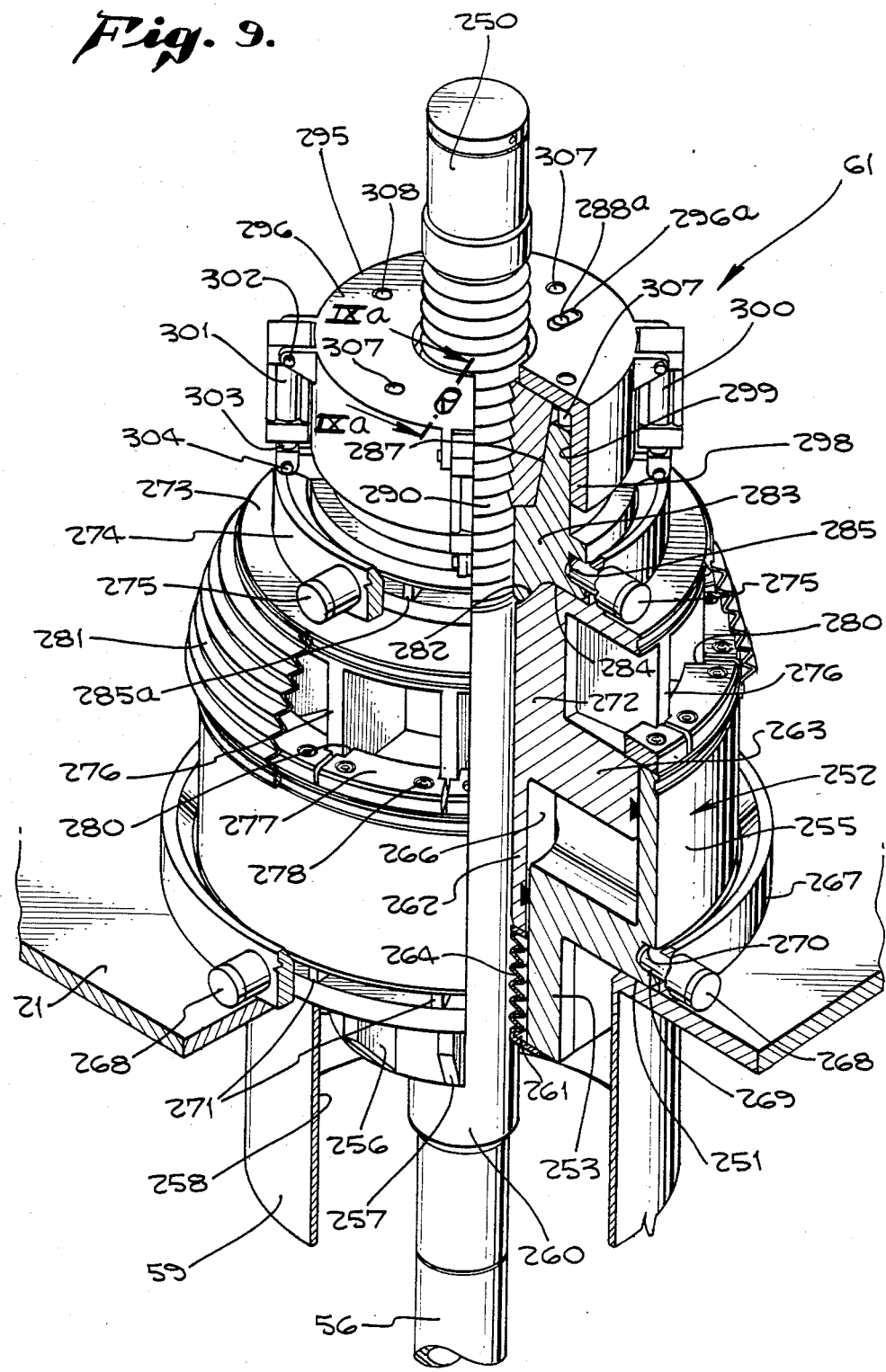
FIG. 9 is a perspective view, partly in section, of a quick latch means for the top end of the tension member.

In FIG. 9, quick latch means 61 is illustrated as landed on top deck 21 of the platform at the top opening of hawse pipe 59. Tension string 52 has been made up to its selected length and the top end of the tension string is indicated at 250. Quick latch means 61 is adapted to be sleeved over the top end portion 250 and lowered into centralized landing engagement as at 251 with the top deck 21.

Quick latch means 61 comprises a generally cylindrical latch body member 252 having a radial inner downwardly directed body wall portion 253, a horizontal radially outwardly extending wall portion 254 extending from the top of portion 253, and a radial outer upwardly extending cylindrical wall portion 255. Bottom portion 253 may be reinforced with a plurality of circumferentially spaced gusset ribs 256 having downwardly and inwardly inclined edge surfaces 257 for guiding and centralizing body member 252 in the top opening 258 of hawse pipe 59. The upper end of a top tension pipe section 56 may be provided with an enlarged cylindrical portion 260, the inner diameter of bottom portion 253 being greater than the outer diameter of top portion 260 to provide an annular space 261 into which may be received lower cylindrical end portions of skirt 262 of a piston member 263. Space 261 may be suitably sealed against into introduction of foreign matter therein by an accordion type elongated seal member 264. The outer cylindrical wall portion 252, horizontal wall portion 254, and piston member 263 define a fluid pressure chamber 266 for introduction of pressure fluid. In FIG. 10, piston member 263 is shown in upper latch actuated closed position.

As mentioned above, latch body member 255 is landed at 251 on circumferential edge margins of deck 21 at opening 258 of the hawse pipe 59. Body member 252 may be secured in landed position by an upstanding circular wall 267 having at circumferentially spaced intervals a plurality of hydraulically actuated lock pins 268. Lock pins 268 when actuated to locking positon as shown in FIG. 10 extend locking pins 269 into an annular outwardly facing groove 270 provided in the outer body wall portion 255. The annular groove 270 is provided with spaced stops 271 to contact locking pins 269 to limit rotation of the quick latch body member 252 with respect to circular wall 267. Thus when the latch means 61 is landed on the deck 21 in centralized position with respect to hawse pipe 59 the lock pins 268 may be actuated by suitable fluid actuating means (not shown) for retaining the body member 252 in landed position and connected to the platform.

Piston member 263 includes an inner cylindrical wall 272 of relatively thick section compared to the depending skirt 266. Wall 272 merges with a top radially outwardly extending flange 273 provided with an upstanding circular wall 274 also provided with a plurality of circumferentially spaced hydraulically actuated lock pins 275. Flange 273 is connected with piston wall 263 by a plurality of circumferentially spaced vertical reinforcing webs 276. Piston member 263 is held against rotation within body member 252 by a plurality of circumferentially arranged cleats 277 bolted to the top portion of wall 255 by suitable bolts 278. Cleats 277 are provided with inner notched edges as at 280 to receive and engage outer edge portions of webs 276 to limit relative rotational movement. A suitable annular accordion type cover 281 may enclose space between flange 273 and the upper edge of wall portion 255.

The inner peripheral upper edge of piston wall 272 may be suitably annularly relieved as at 282 for seating and engaging receivably a corresponding shaped inner portion of annular wedge actuator member 283. Wedge member 283 is seated as at 284 on the top inner peripheral surface of flange 273 interiorly of upstanding wall 274. Wedge actuator means 283 includes an annular groove 285 for reception of the pins of hydraulically actuated pin means 275 for a purpose later described.

Wedge actuator member 283 provides an upright flared seat 287 for a ring or plurality of slip elements 288 having slip teeth 289 for engagement with complementary teeth 290 provided on the upper end portion of the tension string. The seat 287 has a selected taper or wedge angle for moving slips 288 laterally into and out of engagement with the slip teeth 290.

Slip elements 288 are retained in engagement with the wedge actuator means 283 and are slidably connected by a top cap 295 having a radially inwardly extending top wall 296 having a bottom surface in engagement with the top surface 297 of slips 288. Top wall 296 may be provided with a radially extending shouldered slot 296a receiving a headed bolt 288a threaded into the top portion of a slip element 288 to support and guide radial movement of slip element 288. Cap 295 includes an outer wall 298 depending from top wall 296 and having an inner surface for engagement at 299 with an outer radial surface on wedge actuator member 283. In closed latched position of latch means 61, top cap 296 is positioned so that diametrically opposite piston and cylinder means 300 are in collapsed position, cylinder 301 being pivotally connected at 302 to brackets on the cap 295 and rod 303 being pivotally connected at 304 to a bracket 305 carried by wedge actuator ring 283. In closed position of cap 295 as illustrated, upstanding register pins 307 on wedge means 283 have entered ports 308 in top wall 296 of the cap to maintain vertical and coaxial alignment of the cap and wedge actuator means.

In operation of quick latch means 61, in landed position and before engagement of the slip elements 288 with threads 290 on the tension string, the hydraulically actuated pins 275 are retracted so that wedge member 283, slip ring 288, and top cap 295 are rotatable with respect to the top portion of the tension member. When a rough tension force of about 300–400,000 lbs. is placed on the tension string, the top cap 295, slip ring 288 and wedge member 283 are rotated to engage the threads on the tension member. Since the threads may have a pitch of about one inch and the diameter of the tension member may be about twelve inches, it will be apparent that threaded engagement is readily accomplished. Slip elements 288 are provided with finished surfaces at their back edges for engagement with the wedge member landing seat 287 when the cap, slip ring, and wedge member are turned sufficiently so that the wedge member is seated on the upper wall 273 of the piston 263. Pins 275 are then actuated to to secure the wedge member against relative movement with respect to the piston. Stop blocks 285a positioned in selected spaced relation in groove 285 limits relative rotation when pins 275 are actuated into radial inward position. When the wedge member 283 has been secured in relation to the piston member, the top cap 295 is drawn downwardly by the cylinder means 300 to tightly contain the slip ring 288 between the wedge member 283 and the cap 295. Because of the wedge relationship of the slip ring it is urged into tight engagement with threads 290 on the top portion of the tension string.

When it is desired to equalize tension between the different tension strings at a columnar buoyant member 22, fluid pressure is introduced into chamber 266 to raise the piston upwardly and to thereby increase tension on tension member 56 and the connected tension string. Such fluid pressure may be provided by an accumulator (not shown) on deck 22. A tension gauge is also provided to indicate tension on the tension string. Register pin 307 extending from the top of wedge member 283 is received within a thru port in the top wall 296 of the cap 295 to prevent relative rotation of the cap and wedge member so that cylinder means 300 can function without binding. When the top of register pin 307 is flush with surface of the the top wall 296 of the cap, the slip elements 288 are in full tight engagement with threads 290. When the slip element 288 are in such full engagement with threads 290, slip elements 288 are in abutment with or bottom out on the lower shoulder 308 on wedge member 283.

When it is desired to release the quick latch means from the upper tension member 56 of a tension string, the tension member installation rig 100 at the top of the column is axially aligned with the selected tension string. A handling joint (not shown) is connected to the top connecting portion 250 of the upper tension member 260 and the tension load supported by quick latch means 61 is transferred to the installation rig 100. Hydraulic pressure is applied to cylinder means 300 to urge top cap 295 and slip elements 288 upwardly as the tension load is transferred to the installation rig 100. When the tension is relieved from the quick latch means 61, the tension string 56 may be moved either axially or rotated with respect to the quick latch means for the purpose of removal or adjustment.

It should be noted that when the rough tension forces are first applied to the tension string by the installation rig 100 the piston member 263 is in down or retracted position, the pins 275 are retracted and the wedge member, slips and top cap separated from the piston member.

It should be noted that when the rough tension force is first applied to the tension string by the installation rig 100, the piston member 263 is in down or retracted position, the pins 275 retracted and the wedge member, slips, and top cap separated from the piston member. After the tension load is applied to the desired extent by rig 100, the assembly of top cap, slip elements and wedge member are rapidly rotated on the tension string threads 290 until the pins 275 can be actuated to retain the wedge member on the piston member. Slip elements 288 are made of a plurality of annular segments such as from 6 to 12 and are provided sufficient spacing, for example, a quarter of an inch between individual slip elements. The slip elements are quickly engaged with the threads 290 by actuation of the cylinder means 300 and the wedge relationship with the wedge member. Actuation of the piston member 263 to its uppermost position provides a very tight engagement of the slip elements into the threads of the tension string to securely interconnect the top end of the tension string with the platform deck and hawse pipe through the quick latch means.

In the method of installing the tension leg means at a well site, the anchor pile guide means 80 may be lowered to the sea floor at a suitable distance and spacing from the selected drill hole. Each anchor pile guide means is preferably located directly vertically below its corresponding vertical buoyant columnar member 22 of the platform. Pile members are installed and cemented at each of the pile guide means by lateral shifting the platform to facilitate the drilling at each of the spaced locations of the anchor pile guide means. After the anchor pile guide means are installed and pile members cemented in the sea floor, a tension pipe string is installed for each of the anchor pile guide means. It is contemplated that only one tension string will be initially run in each column and is lowered to a point spaced just above the corresponding tension pile connector. One tension string is run in for each platform corner columnar buoyant member 22. All four of the tension string connections are then completed to the anchor pile members. During this connecting operation part of the pile loading is carried by rig 100 which acts as a heave compensator at the platform deck. After a tension string is connected at each corner column 22 of the platform with its corresponding pile member at the sea floor, the tension on each of the four tension strings is increased equally and to a level bringing the platform into a tension-moored mode. It is anticipated that this operation would be conducted during mild weather where a lower tension would be adequate to achieve a preliminary tension mooring. Once the initial members are installed under tension the remaining tension strings may be run in to connect the remaining three pile members and platform. The tension string assembly may embody the same construction as that above described. When all of the tension strings have been connected the anchor pile members and the platform and the tension strings have been substantially equalized in tension load, the tension member stabilizers may be energized with fluid pressure to bring the rubber expandable element into engagement with the hawse pipes.

The tension leg means may now be placed under required tension leg tension by changing the ballast in the horizontal and vertically buoyant members.

It will be understood that various changes and modifications may be made in the tension leg means and method of installing the same that fall within the spirit of this invention and all such changes and modifications coming within the scope of the appended claims are embraced thereby.

I claim:

1. In a tension leg for a marine platform having a hawse pipe, and an anchor pile number fixed in a seabed, the combination of:
   a comprising tension pipe string comprising plurality of pipe string members;
   couplings interconnecting said pipe string members;
   connector means on said anchor pile member and on the lower end of the lowermost pipe member,
   said connector means including lock means against relative rotation;
   said pipe string extending into said hawse pipe;
   latch connector means at the upper end of the uppermost pipe member and on said platform for connecting the upper end of said tension pipe string to said platform,
   said latch means including fluid pressure means for adjusting tension in said tension pipe string and for exerting a gripping force on said upper end of the uppermost pipe member.

2. A tension leg as stated in claim 1 including a flexible connection means adjacent said connector means at the lower end of the tension pipe string,
   and a second flexible connection means in said pipe string at the lower end of said hawse pipe.

3. A tension leg as stated in claim 1 including
   a stabilizing means carried by said tension pipe string above said second flexible means and cooperable with the lower end of said hawse pipe.

4. In a tension leg means for a marine platform, said tension leg means including a tension pipe string comprising a plurality of pipe string members and couplings interconnecting said members, the provision of:
   means for installing anchor means on the sea floor for connection to said pipe string including
   anchor template guide frame means comprising peripheral frame members and internal frame members providing a rigid template anchor structure;
   a plurality of anchor pile conductor members in spaced relation around the periphery of said frame means;
   a pile anchor member adapted to be set in the sea floor through each of said anchor pile conductor members;

and connector means on each anchor pile member at the associated conductor member for connection to the bottom pipe member of said tension pipe string.

5. A tension leg as stated in claim 4 including an index means on said guide frame means adapted to position an articulated guidance means for connecting a bottom member of a tension string to an anchor pile member in one of said anchor pile conductor members.

6. A tension leg as stated in claim 4 including a level indicator on said guide frame means for vertical alignment of said anchor pile conductor members.

7. A tension leg as stated in claim 4 including means on guide said frame means for transmitting a signal for locating said frame means.

8. A tension leg as stated in claim 5 wherein said means for installing said anchor means on said sea floor include
an elongated hollow cylindrical member,
a guidepost on said anchor pile frame means receivable within said hollow cylindrical member,
fluid actuated index means carried by said cylindrical member at its lower end for cooperable engagement with said index means on said guidepost;
laterally extending arm means pivotally carried by said cylindrical member, said arm means having telescopically arranged outer arm portions;
means for connecting a pair of guidelines to said outer arm portions;
fluid actuating means for pivoting said arm means into a folded upright position and into a horizontal operable position;
said telescopic outer arm portions being adapted to be retracted;
and means for actuating a positioning jack for indexing said arm means about said guidepost and for aligning said arm means with a pile conductor member on the frame means.

9. A tension leg as stated in claim 4 including
a central guide post means on said frame means;
a guidance means rotatably supported on said guidepost means,
said guidance means including laterally extendable arm means provided with a pair of guidelines at outer arm portions thereof;
and actuating means for indexing said guidance means rotatably about said guidepost for alignment of said pair of guidelines with each of said anchor pile conductor members.

10. A tension leg as stated in claim 9 including means at the upper end of said guidance means for providing automatic connection to fluid pressure lines for actuating said arm means and said actuating means.

11. A tension leg as stated in claim 9 wherein said arm means include outer portions telescopically arranged and
a registration plate at the outer end thereof for engagement with a pile conductor member.

12. A tension leg as stated in claim 11 including fluid actuating means carried by said arm means for extension and retraction of said arm means.

13. A tension leg as stated in claim 9 wherein said arm means is pivotally connected to said cylindrical member for pivoting said arm means from horizontal to vertical position alongside guide post for retrieval of said guidance means.

14. A tension leg as stated in claim 9 including means at the upper end of said guidance means for providing automatic connection to fluid pressure lines extending from a pressure fluid source,
said fluid pressure lines being connected to actuating means for arm means and for index means.

15. A tension leg as stated in claim 9 wherein said installing means includes
a retrievable control pod means comprising
a cylindrical body member adapted to be connected to said guide post means said anchor template structure,
a fluid pressure line means connected with said body member for supplying pressure fluid;
means for indexing said retrievable control pod means in angular relation with respect to aid center post means on said anchor template structure;
means for positioning said control pod means at a selected height;
and means for automatically coupling said fluid pressure lines connected with said body member to fluid pressure lines on said guide post means.

16. A tension leg as stated in claim 4 wherein
said platform includes a hawse pipe for each anchor pile conductor member,
said hawse pipes and conductor members being in the same corresponding spaced relation,
each tension pipe string extending from a hawse pipe to the corresponding conductor member and pile anchor member therein,
said tension pipe strings being substantially parallel and under uniform tension.

17. A tension leg as stated in claim 4 wherein said connector means on each anchor pile member includes
lock means for resisting relative rotation between said anchor pile member and said tension pipe string.

18. A tension leg as stated in claim 4 wherein said connector means on each anchor pile member includes
an anchor pile member end portion provided with external tension transmitting threads;
a pile coupling housing having internal tension transmitting threads engageable with the threads on the pile end portion;
said pile coupling housing being operably connected to the lower end of a pipe string member;
and means for locking said pile coupling housing and said pile member against relative rotation.

19. A tension leg as stated in claim 18 wherein
said lock means includes an internal longitudinally extending lock sleeve having an annular radially enlarged portion providing a key lock;
and cooperable lock recesses provided on said pile coupling housing and said pile member cooperable with said key lock.

20. A tension leg as stated in claim 18 wherein said lock means includes
a lock ring within said housing;
a lock recess in the upper end of said pile end portion;
and a key lock carried by said lock ring engageable with said lock recess.

21. A tension leg as stated in claim 20 wherein said lock ring and said key lock are biased in the direction of the axis of said pile member.

22. A tension leg as stated in claim 18 wherein said pile coupling housing includes
a removable cap provided with an annular shoulder engageable with said radially enlarged section of the lock sleeve for restricting relative movement of the lock sleeve with respect to the pile coupling housing.

23. A tension leg as stated in claim 18 including release tool means adapted to be run through said tension pipe string and said pile coupling housing;
said release tool means having means for engagement with said lock ring for raising said lock ring to disengage said key lock from said lock recess in said pile member portion whereby, upon relief of tension on said tension threads, said pile coupling housing is adapted to be unthreaded from said threaded portion on the anchor pile member.

24. In a tension leg as stated in claim 4 wherein each of said couplings interconnecting said pipe string members comprises
a coarse buttress thread on one end of each pipe string member,
said threads having a flat seizing taper arranged at an angle to the axis of the tension member of 30 degrees or less, said buttress threads including shoulder portions arranged at an angle to the flat taper portion of approximately 90 degrees, and
a coupling member provided with internal mating threads at opposite ends of the coupling member for engagement with said pipe string member threads whereby tension loads applied in the direction of the longitudinal axis of the tension pipe string provide high normal forces between said mating seizing taper portions on said coupling and end portion threads for resisting backoff of said coupling member and pipe string member end portions under tension loads.

25. In a tension leg as stated in claim 4 including
a flexible coupling means in said pipe string adjacent and above said connector means for the lower end of the pipe string to the anchor pile member,
and a flexible coupling means in said tension pipe string adjacent the lower end of the hawse pipe through which said pipe string passes in said platform.

26. In a tension leg for a marine platform, said tension leg means including a tension pipe string having a plurality of pipe string members, the upper end of said pipe string extending to a deck on the platform, the provision of:
a quick latch means for connecting the uppermost pipe string member to said platform, said latch means comprising
a cylindrical latch body member arranged coaxially with said pipe string member;
means securing said latch body member to said platform;
an annular piston within said latch body member coaxial with said pipe string member and said body member and movable axially thereof;
a latch top cap member above said annular piston;
a wedge actuator member between said cap member and piston member;
a plurality of arcuate segmental slip elements carried between said cap member and wedge actuator member, said slip elements having threads engageable with threads on said pipe string member;
means carried by said cap member and connected to said wedge actuator member for causing relative axial movement therebetween for release and engagement of said arcuate slip elements;
and means for releasably securing said wedge actuator member against axial relative movement with respect to said annular piston member.

27. A tension leg as stated in claim 26 including means for preventing relative rotation between said latch body member and said piston member.

28. A means for connecting a tension member to a support member and for adjusting tension therein comprising:
means for securing a latch body member to said support member;
a wedge slip assembly engageable with said tension member, said wedge slip assembly providing relative axial and rotative movement with respect to said tension member;
said wedge slip assembly comprising a plurality of slip elements adapted for threaded engagement with threads on said tension member,
a annular piston member,
a wedge actuator member releasably secured to said piston member;
fluid actuating means for forcing said wedge actuator member against said slip assembly to wedge said slip elements into tight engagement with threads on said tension member;
and means for actuating said annular piston member for adjusting tension in said tension pipe string.

29. In a method of installing a tension leg from a floatable marine platform having a hawse pipe; the steps of:
lowering a tension pipe string comprising a plurality of tension pipe members including a connector means at the bottom end thereof;
attaching said connector means to a fixed anchor pile member and locking said connector means against relative rotation with respect to said anchor pile member;
connecting the upper end of said tension pipe string to a latch connector means carried by said platform;
and applying fluid pressure to said latch connector means to adjust tension in said pipe string.

30. In a method as stated in claim 29 including the step of:
locating a stabilizing means having an expandable member on said tension pipe string for cooperable contact with the lower portion of said hawse pipe.

31. In a method of installing anchor pile members in the sea floor and connecting a tension leg to said anchor pile members comprising the steps of:
lowering an anchor template pile guide structure having a plurality of anchor pile conductors thereon to the sea floor;
lowering a guidance means over a guidepost provided on said anchor pile structure;
said guidance means including arm means;
rotating said arm means about said guide post and indexing their position with respect to an anchor pile conductor guide;
and extending said arm means to position a pair of guidelines adjacent said conductor guide to facilitate guidance of anchor pile members into and through said anchor pile conductors.

32. A method of installing a tension leg between a floatable marine platform having a hawse pipe and an anchor means on the sea floor, the steps of:

lowering a tension pipe string comprising a plurality of tension pipe members including a bottom connector means at the bottom end thereof;

attaching said bottom connector means to said anchor means;

connecting the upper end of said tension pipe string to an upper connector means carried by said platform;

applying fluid pressure to said upper connector means at said platform to adjust tension in said pipe string;

and gripping and holding the upper end of said pipe string by the upper connector means after adjusting tension therein.

33. In the method as stated in claim 32 including the steps of:

locating a stabilizing means having an expandable member on said tension pipe string for cooperable contact with the lower portion of said hawse pipe.

34. In a method of installing anchor means in the sea floor and connecting a tension leg to said anchor means comprising the steps of:

lowering an anchor template pile guide structure having a plurality of conductor guides thereon to the sea floor;

lowering a guidance means over a guide post provided on said anchor template structure;

said guidance means including arm means;

rotating said arm means about said guide post and indexing their position with respect to a conductor guide;

and positioning the end of said arm means adjacent to said conductor guide to facilitate conducting said tension leg to said anchor means.

35. In a tension leg for a marine platform, said tension leg including a tension pipe string comprising a plurality of pipe string members and couplings interconnecting said members, the provision of:

means for installing anchor means on the sea floor and for connecting the bottom pipe string member thereto including:

anchor template guide frame means comprising peripheral frame members and internal frame members providing a rigid template anchor structure;

a plurality of anchor conductor members in spaced relation on said frame means;

a pile anchor member adapted to be set in the sea floor through said anchor conductor members;

and means at said template anchor structure for connecting the bottom pipe member of said tension pipe string to said anchor means.

36. A tension leg as stated in claim 35 wherein said means for installing said anchor means and bottom member of the pipe string includes an elongated hollow cylindrical member, a central guide post on said anchor frame means receivable within said hollow cylindrical member, fluid actuated index means carried by said cylindrical member at its lower end for cooperable engagement with said index means on said guide post;

laterally extending arm means pivotally carried by said cylindrical member, and means for actuating a positioning jack for indexing said arm means about said guide post and for aligning said arm means with a conductor member on the frame means.

37. A tension leg as stated in claim 35 including a central guide post means on said frame means;

a guidance means rotatably supported on said guide post means, said guidance means including laterally extending arm means;

and actuating means for indexing said guide means rotatably about said guide post for alignment of said arm means with said anchor conductor members.

38. A tension leg as stated in claim 35 wherein said installing means includes a retrievable control pod means comprising a cylindrical body member adapted to be connected to a guide post means on said anchor template structure, a fluid pressure line means connected with said body member for supplying pressure fluids;

means for indexing said retrievable control pod means an angular relation with respect to said post means on said template structure;

means for positioning said control pod means at a selected height;

and means for automatically coupling said fluid pressure line means connected with said body member to said fluid pressure lines on said guide post means.

39. A tension leg as stated in claim 35 wherein said platform includes a hawse pipe for each anchor conductor member, said hawse pipes and conductor members being in the same corresponding spaced relation, each tension pipe string extending from the hawse pipe to the corresponding conductor member, said tension pipe strings being substantially parallel and under uniform tension.

40. In a tension leg for a marine platform having a hawse pipe and anchor means fixed in a seabed, the combination of:

a tension pipe string comprising a plurality of pipe string members;

couplings interconnecting said pipe string members;

lower connector means for connecting the lower end of the lowermost pipe member to said anchor means at a conductor member on said anchor means;

said pipe string extending into said hawse pipe;

upper connector means on said platform for connecting the upper end of said pipe string to said platform, said upper connector means including fluid pressure means at said platform for adjusting tension in said pipe string, and means for gripping and holding the upper end of the pipe string at a selected tension.

* * * * *

UNITED STATES PATENT AND TRADEMARK OFFICE
CERTIFICATE OF CORRECTION

PATENT NO. : 4,540,314
DATED : September 10, 1985
INVENTOR(S) : Chester B. Falkner, Jr.

It is certified that error appears in the above-identified patent and that said Letters Patent is hereby corrected as shown below:

Column 16, line 28, delete "comprising", first occurrence.

Column 16, line 28, before "plurality" insert -- a --.

Column 20, line 7, "means" should read -- device --.

Signed and Sealed this

Seventh Day of January 1986

[SEAL]

Attest:

DONALD J. QUIGG

Attesting Officer

Commissioner of Patents and Trademarks